Patented Sept. 22, 1953

2,653,143

UNITED STATES PATENT OFFICE 2,653,143

CONDENSATION PRODUCTS OF BIS-AMINOTRIAZINES

Peter L. de Benneville, Philadelphia, and Vincent Carr Meunier, Flourtown, Pa., assignors to Rohm & Haas Company, Philadelphia, Pa., a corporation of Delaware No Drawing. Application March 12, 1952, Serial No. 276,233

11 Claims. (Cl. 260—67.7)

This invention relates to condensation products of bis-(aminotriazines) of the general formula:

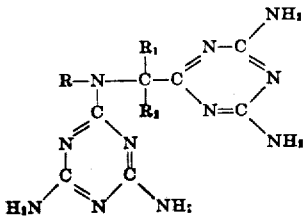

in which R is an alkyl group of from one to eight carbon atoms and which contains a hydrogen atom on the carbon atom adjacent the nitrogen atom, $R_1$ is a hydrogen or a methyl group, and $R_2$ is an alkyl group of one to eight carbon atoms. We have found that bis-(aminotriazines) of this structure react readily with formaldehyde or with formaldehyde and an alcohol to give condensates having a variety of industrial uses. In many ways these new condensates are superior to the aminotriazine resins now commercially available.

In copending applications Serial Nos. 276,231 and 276,232, filed on even date herewith, it is shown that bis-(aminotriazines) of the above formula can be made by the following series of reactions:

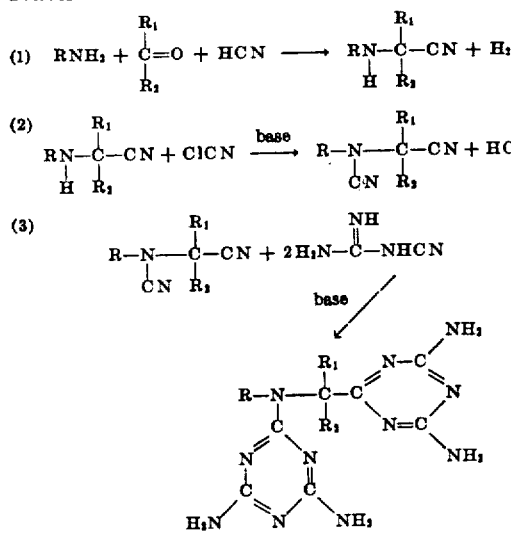

Reaction (1) is the known reaction that takes place between a primary amine and a cyanohydrin formed from HCN and an aldehyde or ketone. In the preparation of the bis-(aminotriazines) useful for the practice of this invention the primary amine used in reaction (1) should be one having a normal or secondary but not a tertiary alkyl group such as methylamine, ethylamine, propylamine, isopropylamine, normal butylamine, secondary butylamine, isobutylamine, or 2-ethylhexylamine. The carbonyl compound should be one in which $R_1$ is hydrogen or methyl and $R_2$ is an alkyl group of one to eight carbon atoms. Representative carbonyl compounds are acetaldehyde, propionaldehyde, acetone, methyl ethyl ketone, and nonylaldehyde.

Reaction (2) is carried out on the alkaline side in an inert solvent such as benzene at room temperature or slightly above room temperature up to about 50° C. The reaction is exothermic and should be carried out in reactors equipped with cooling means.

Reaction (3) is carried out in an inert solvent such as a lower alcohol and in the presence of a small amount of alkaline catalyst. The reaction is carried out at the reflux temperature and is usually accompanied by an exotherm. The bis-(aminotriazine) precipitates from the reaction medium as it is formed and is readily freed from excess dicyanodiamine by a hot water wash.

From the above formulae it can be observed that the bis-(aminotriazine) obtained by this series of reactions is with respect to one of the triazine rings a substituted melamine and with respect to the other a substituted guanamine. We have caused them to react with formaldehyde and with formaldehyde and alcohol to give products of various degrees of condensation and have found that these condensation products have valuable industrial usage. The initial condensation product or "A"-stage condensate is a methylol compound that may, among other things, be used to stabilize rayon against shrinking without deleterious effects upon abrasion-resistance. The moderately condensed "B"-stage product was found useful in stabilizing wool against shrinkage and as an adhesive. The more highly condensed "B"-stage products are even better stabilizers of wool against shrinkage and are excellent wet-strength paper resins. The methylated resins formed by the reaction of the bis-(aminotriazine) with formaldehyde and methyl alcohol are water-soluble products that may be used to stiffen nylon, and the butylated resins are soluble in organic solvents and make excellent coating compositions.

In the preparation of these condensation products from six to ten mols of formaldehyde may be reacted with the bis-(aminotriazine). The reaction is carried out on the alkaline side, preferably at a pH of from 7.5 to 9, by simply heating the bis-(aminotriazine) with an aqueous or alcoholic solution of the aldehyde. The reaction is easily controlled and great latitude in reaction conditions is available.

The following examples illustrate the preparation of the bis-(aminotriazines).

EXAMPLE A

A. Preparation of

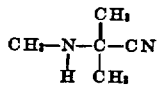

Over a period of two hours 132.2 parts of gaseous monomethylamine was added to 340.4 parts of acetone cyanohydrin. During the addition the temperature was kept in the range of −10° C. to +10° C. The reaction mixture was then stripped at room temperature and used in Part B without further purification.

B. Preparation of

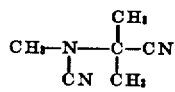

The crude aminonitrile as prepared in part A was mixed at 10° C. with 352 parts of benzene, 276.8 parts of anhydrous potassium carbonate, and 128 parts of water. There was then added at 15°-25° C. and over a period of 65 minutes 246 parts of cyanogen chloride. Stirring was continued for one-half hour at room temperature and the reaction mixture allowed to stand overnight. It was then heated to 50° C., cooled, the aqueous layer separated, and the benzene layer filtered, dried over anhydrous magnesium sulfate and distilled. There was obtained 213.5 parts of a light brown oil boiling at 89°-90° C. at 2 mm.

C. Preparation of

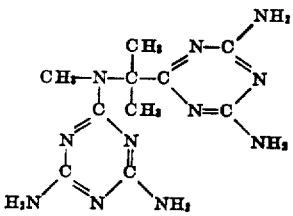

To a stirred mixture of 200 parts of isopropanol, 128.2 parts of the cyanoaminonitrile as prepared in part B, and 193 parts of dicyanodiamide there was added at reflux (75°-85° C.) and over a period of 90 minutes a solution of 35 parts of 85% potassium hydroxide in 400 parts of isopropanol. The mixture was stirred at reflux for 20.5 hours and then cooled. The fine white solid which had formed was filtered off and washed with hot water. Two hundred twenty-six parts of the bis-(aminotriazine) was obtained. It melted at 430°-435° C.

EXAMPLE B

A. Preparation of

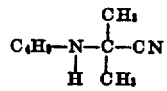

Over a period of 15 minutes and at a temperature of 25°-40° C. 127.4 parts of acetone cyanohydrin was added to 120.5 parts of n-butylamine. Stirring was continued for 75 minutes at room temperature and then for 30 minutes at 50° C. The reaction mixture was cooled to room temperature and benzene added. Seventeen parts of water was separated. The benzene layer was distilled and yielded 182 parts of aminonitrile as a pale yellow liquid boiling at 86°-88° C. at 28 mm.

B. Preparation of

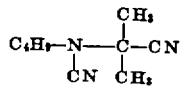

To a stirred solution of 44 parts of benzene and 30.8 parts of cyanogen chloride there was added a solution of 71.3 parts of aminonitrile prepared as in part A in 88 parts of benzene. The addition was made at 20°-40° C. over a period of 30 minutes. A solution of 34.5 parts of anhydrous potassium carbonate in 35 parts of water was then added in 15 minutes at 28°-35° C. The reaction mixture was stirred for two hours at room temperature and for 15 minutes at 50° C. It was then cooled, filtered, and the benzene layer distilled. Forty-five parts of cyanoaminonitrile was obtained as a pale yellow liquid boiling at 96° C. at 1 mm.

C. Preparation of

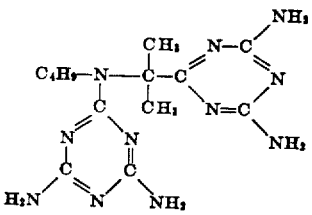

To a stirred mixture of 44 parts of isopropanol, 23.2 parts of cyanoaminonitrile as prepared in part B, and 25.9 parts of dicyanodiamide there was added at reflux (85° C.) a solution of 4.6 parts of 85% potassium hydroxide in 56 parts of isopropanol. The addition was made over a period of 15 minutes by which time all ingredients were in solution. Heating at reflux was continued and after 30 minutes some solid precipitated. The refluxing was continued for an additional six hours and the reaction mixture was then cooled, filtered and washed with hot water. Twenty-two parts of bis-triazine, a white solid melting at 271°-272° C., was obtained.

EXAMPLE C

A. Preparation of

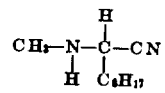

To a mixture of 166 parts of 3,5,5-trimethylhexaldehyde cyanohydrin and 40 parts of benzene there was added 32.5 parts of methylamine. The addition was made at 15°-20° C. over a period of one and one-half hours. The addition of more benzene caused the separation of 16 parts of water which was removed. The benzene layer was then dried over anhydrous sodium sulfate and stripped at 100° C. at 18 mm. There was obtained 168.8 parts of the aminonitrile.

B. Preparation of

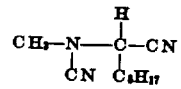

A solution of 98.6 parts of the above aminonitrile in 40 parts of benzene was added at 10°–20° C. and over a 30 minute period to a solution of 33.9 parts of cyanogen chloride in 40 parts of benzene. To this mixture was then added at 10°–15° C. and over a 15 minute period a solution of 34.5 parts of potassium carbonate in 40 parts of water. The reaction mixture was stirred at room temperature for one hour, filtered, and the water layer separated. The benzene layer was distilled to yield 90.5 parts of the cyanoaminonitrile boiling at 133°–140° C. at 1.5 mm.

C. Preparation of

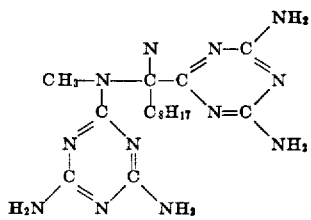

To a mixture of 38.6 parts of the cyanoaminonitrile of part B, 40 parts of isopropanol, and 37 parts of dicyanodiamide there was added quite rapidly at 85° C. a solution of 6.6 parts of potassium hydroxide, reagent grade, in 80 parts of isopropanol. The mixture was refluxed for 22 hours, filtered at room temperature, and the residue washed with hot water (65° C.). On air-drying, there was obtained 40 parts of solid product melting at 256°–258° C.

Analogous bis-(aminotriazines) within the class above-defined can be made following these procedures and selecting other primary amines and ketones. The bis-(aminotriazines) are converted to the products of this invention by procedures illustrated by the following examples:

EXAMPLE 1

*Preparation of "A"-stage condensation products*

Into a flask equipped with thermometer, reflux condenser, and mechanical agitator were charged 163.2 parts of 36.7% aqueous formaldehyde (2 mols) and 625 parts of water. The pH of the solution was adjusted to 8.1 with 10% aqueous soda ash solution. To the formaldehyde solution was added 72.75 parts (0.25 mol) of the bis-(aminotriazine) of Example A. The mixture was heated to 80° C. and after one hour a clear solution was obtained. The product was cooled with an ice-bath and filtered with Super Cel. It had the following physical properties:

Solids ------------------------------ 13.1%
Viscosity --------------------------- 20 centipoises
pH --------------------------------- 8.2

A rayon fabric was padded through a 4.3% aqueous solution of the condensate adjusted with phosphoric acid to pH 4 and squeezed to a wet pick-up of about 90%. The treated fabric was cured for ten minutes at 300° F. Shrinkage tests showed 3.3% shrinkage as against 8.0% for the untreated fabric.

EXAMPLE 2

*Preparation of moderately condensed "B"-stage condensation products*

A sample of condensate prepared as described in Example 1 was stripped in vacuo from 13.1% solids concentration to 54.7%. At the end of the stripping the viscosity was 1.4 poises and the pH 7.9. The condensate was heated at 80° C. for an hour after which time the viscosity rose to 2.7 poises. The resin was cooled to room temperature.

The reaction product was applied to wood laminae which were then assembled into a plywood and hot-bonded for four minutes at 250° F. Both catalyzed (7% NH₄SCN) and uncatalyzed formulations gave boil-resistant bonds in the plywood. The catalyzed formulations when used in cold-bonding (24 hours in cold clamps plus six days conditioning at 75° F.) also gave boil-resistant bonds.

A wool flannel, free of grease and spinning oils, was padded through a solution containing 3% of the resin, a small amount of a synthetic non-ionic wetting agent, and 1% of phosphoric acid. After passing through squeeze rolls the padding was repeated with the result that the impregnated flannel had a wet pick-up of 75%. It was dried in an oven at 240° F. for ten minutes. No shrinkage was measurable even after five washings.

EXAMPLE 3

*Preparation of highly condensed "B"-stage condensation products*

A sample of condensate prepared as described in Example 2 was diluted with distilled water to 20% solids concentration. Sufficient 37% hydrochloric acid was added to lower the pH to 2.0. This required about one mol of hydrochloric acid per mol of bis-(aminotriazine) contained in the sample. The treated sample was aged for three days at 27°–30° C. at the end of which time its viscosity had increased from about 20 to 125 centipoises. The solution was stabilized by dilution with distilled water to 10% solids concentration.

Bleached sulfite pulp was beaten at 2% to a Canadian freeness value of 600. It was then diluted to one percent and to a 2 kg. sample in a Valley disintegrator there was stirred in sufficient 10% solution of the resin to provide 0.4 g. of resin solids. The pH of the pulp was adjusted to 4 by the addition of hydrochloric acid. It was then diluted to one-quarter percent and a 1300 ml. sample was run into a sheet mold and a sheet 8½" x 8½" formed. The sheet was pressed for two minutes at 100 p. s. i., dried for ten minutes at 200° F., and finally aged at 75° F. and 50% relative humidity. At intervals it was tested for wet strength using 4" x 1" strips soaked in water for one hour. After 28 days the treated paper had a wet tensile strength of 4.1 lbs./in. and a dry tensile strength of 14.6 lbs./in. as compared with a wet tensile of 0.5 lb./in. and a dry tensile of 10 lbs./in. for the untreated paper.

EXAMPLE 4

*Preparation of "A"-stage alcohol-modified condensation products*

Into a three-necked flask equipped with a thermometer, reflux condenser, and mechanical agitator were charged 192 parts (6.0 mols) of methanol and a mixture of 48.3 parts of flake (91%) paraformaldehyde and 11.3 parts of 36.1% aqueous formaldehyde (totalling 1.60 mols of HCHO). The pH was raised to 8.4–8.6 (cresol red) with 25% sodium hydroxide solution. The mixture was heated to 70° C. and after one-half hour a clear solution was obtained. Next, 58.2 parts (0.2 mol) of the ditriazine of Example A was added and the resultant mixture was heated at reflux (73° C.) for one-half hour (pH 8.4–8.6—cresol red). The pH was lowered to and held at 3.8–4.0 (bromocresol green) by repeated additions of 90% formic acid. After heating for one hour (73° C.) a clear solution was obtained. The product was cooled with an ice-bath and the pH was adjusted to 7.0–7.2 (bromothymol blue) with 40% sodium hydroxide solution. The product was filtered with Super Cel. It had the following physical properties:

| | |
|---|---|
| Solids | 35.8% |
| Viscosity (25° C.) | 0.5 poise |
| Water tolerance (25° C.) | 10 cc./10 g. resin |
| pH (bromothymol blue) | 7.0–7.2 |

A sample of the product thus obtained was diluted to 12.5% resin content with 10% phosphoric acid. Scoured nylon taffeta was padded through, given a light squeeze, dried at room temperature, and cured at 300° F. for ten minutes. The resulting fabric was leathery and very stiff but possessed a full hand. The finish was resistant to washing.

EXAMPLE 5

*Preparation of "B"-stage alcohol-modified condensation product from the bis-(aminotriazine) of Example A*

Into a three-necked flask equipped with reflux condenser, mechanical agitator, thermometer, and water separator were charged 72.75 parts (0.25 mol) of the ditriazine of Example A, 124.0 parts (1.5 mols of HCHO) of a solution of formaldehyde in n-butyl alcohol prepared from 49.6 parts of paraformaldehdye (91%) and 74.4 parts of n-butyl alcohol, 124.0 additional parts of n-butyl alcohol and 29.0 parts of xylol. The pH of the reaction mixture was 7.2–7.4 (bromothymol blue). The mixture was heated to reflux temperature (110° C.) and held at that temperature for 30 minutes. At this point the pH was lowered to 4.6–4.8 (bromocresol green) with 50% aqueous formic acid. Refluxing was resumed. The resin was refluxed under conditions of continuous removal of the aqueous phase forming in the separator. After one hour the resin was clear. After three and one-half hours a total of 21.0 parts of aqueous phase had separated. The resin was stripped to a calculated 70% solids. The batch temperature rose to 132° C. At this stage the resin was "swept" with 50.0 parts of butanol. The resin was then diluted with butanol, cooled, and filtered with filter aid. It had the following physical properties:

| | |
|---|---|
| Solids | 61.4% |
| Viscosity | 2.8 poises |
| Mineral thinner tolerance | Infinite |
| Isooctane tolerance | Infinite |
| Acid number | 2.5 |
| Color (P. and V. scale) | 2. |

The product thus obtained was incorporated in a baking enamel having the following formulation:

50% titanium dioxide
50% binder
70% Commercial alkyd resin from phthalic acid, glycerol, and cocoanut oil acids
30% nitrogen resin of this example reduced to proper viscosity with xylol.

This enamel cured rapidly and gave a coating film that possessed excellent adhesion, gloss, and alkali- and soap-resistance.

EXAMPLE 6

*Preparation of "B"-stage alcohol-modified condensation product from the bis-(aminotriazine) of Example B*

Into a three-necked flask equipped with reflux condenser, mechanical agitator, thermometer, and water separator were charged 83.3 parts (0.25 mol) of the ditriazine of Example B, 124.0 parts (1.50 mols of HCHO) of a solution of formaldehyde in n-butyl alcohol prepared from 49.6 parts of paraformaldehyde (91%) and 74.4 parts of n-butyl alcohol, 32.0 additional parts of n-butyl alcohol, and 33.3 parts of xylol. The pH of the reaction mixture was 8.0–8.1 (thymol blue). The mixture was heated to reflux temperature (115° C.) and held for 15 minutes during which time the mixture became clear. At this point the pH was lowered to 4.6–4.8 (bromocresol green) with 50% aqueous formic acid. Refluxing was resumed under conditions of continuous removal of aqueous phase forming in the separator. After three hours a total of 22.5 parts of aqueous phase had separated. The resin was "swept" with 83.0 parts of n-butyl alcohol and then stripped to a calculated 75% solids. The batch temperature rose to 131° C. The resin was then diluted with xylol, cooled, and filtered with Super Cel. It had the following physical properties:

| | |
|---|---|
| Solids | 60.7% |
| Viscosity (25° C.) | 2.7 poises |
| Mineral thinner tolerance | Infinite |
| Isooctane tolerance | Infinite |
| Acid number | 0.64 |
| Color (P. and V. scale) | 1 |

This resin also gave an excellent coating film when incorporated in a baking enamel formulated as in Example 5.

EXAMPLE 7

*Preparation of "B"-stage Alcohol-modified Condensation Product from the Bis-(aminotriazine) of Example C*

Into a three-necked flask equipped with reflux condenser, mechanical agitator, thermometer, and water separator were charged 37.5 parts (0.1 mol) of the ditriazine of Example C, 49.6 parts (0.6 mol of HCHO) of a solution of formaldehyde in n-butyl alcohol prepared from 19.85 parts of paraformaldehyde (91%) and 29.75 parts of n-butyl alcohol, 13.0 addiitonal parts of n-butyl alcohol, and 14.6 parts of xylol. The pH of the reaction mixture was 7.2–7.4 (bromothymol blue). The mixture was heated to reflux temperature (115° C.) and held for 15 minutes at this temperature. During this time the resin became clear. The pH was lowered to 4.6–4.8 (bromocresol green) with 50% aqueous formic acid. The resin was then refluxed with continuous removal of the aqueous phase forming in the separator. After one and one-half hours, a total of 6.5 parts of aqueous phase had separated. At this point the resin was swept with 37.0 parts of n-butyl alcohol and then stripped to a calculated 75% solids. The batch temperature rose to 138° C. The resin was then diluted with xylol, cooled, and filtered with Super Cel. It had the following physical properties:

| | |
|---|---|
| Solids | 53.7% (acid catalyzed) |
| Viscosity | 2.4 poises |
| Mineral thinner tolerance | Infinite |
| Isooctane tolerance | 100 ml./10 g. |
| Acid number | 2.4 |
| Color (P. and V. scale) | 8+ |

This resin also gives excellent coating films when incorporated in baking enamels.

In place of the butanol used in Examples 5, 6, and 7 other monohydric alcohols such as propanol, octyl alcohol, and benzyl alcohol may be used to give condensation products that are soluble in organic solvents. Such condensation products may be used alone as binder in coating compositions or, as illustrated above, they may be combined with other coating resins such as the alkyd-type resins.

The products of this invention may also be used to impregnate cellulosic filling materials for the preparation of laminated and molded products for which purpose the water-soluble condensates are preferred. They may be combined with other nitrogen resins such as those based on urea, melamine, and other mono-(aminotriazines); and joint condensates with such resin-forming nitrogen compounds are contemplated. In this way the most desirable properties of a plurality of resins may be combined into one product.

We claim:

1. A composition of matter comprising a condensation product of formaldehyde and a bis-(aminotriazine) of the formula

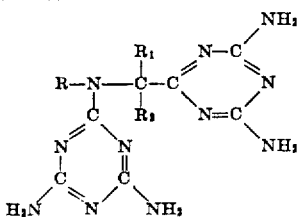

wherein R is an alkyl group of one to eight carbon atoms and contains a hydrogen atom on the carbon atom adjacent to the nitrogen atom, $R_1$ is selected from the group consisting of hydrogen and methyl, and $R_2$ is an alkyl group of one to eight carbon atoms.

2. A composition of matter comprising a condensation product of formaldehyde and a bis-(aminotriazine) of the formula

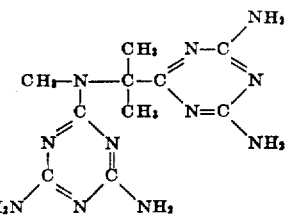

3. A composition of matter comprising the reaction product of six to ten mols of formaldehyde and one mol of a bis-(aminotriazine) of the formula

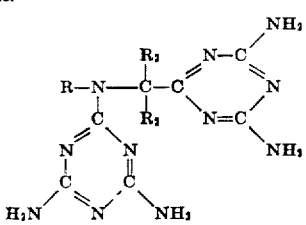

wherein R is an alkyl group of one to eight carbon atoms and contains a hydrogen atom on the carbon atom adjacent to the nitrogen atom, $R_1$ is selected from the group consisting of hydrogen and methyl, and $R_2$ is an alkyl group of one to eight carbon atoms.

4. A composition of matter comprising the alcohol-modified reaction product of six to ten mols of formaldehyde and one mol of a bis-(aminotriazine) of the formula

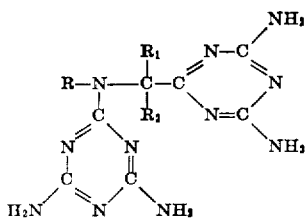

wherein R is an alkyl group of one to eight carbon atoms and contains a hydrogen atom on the carbon atom adjacent to the nitrogen atom, $R_1$ is selected from the group consisting of hydrogen and methyl, and $R_2$ is an alkyl group of one to eight carbon atoms, said reaction product being obtained by carrying out the said reaction in an alcoholic medium.

5. A composition of matter comprising the butanol-modified reaction product of six to ten mols of formaldehyde and one mol of a bis-(aminotriazine) of the formula

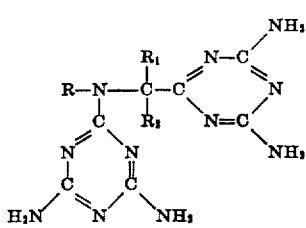

wherein R is an alkyl group of one to eight carbon atoms and contains a hydrogen atom on the carbon atom adjacent to the nitrogen atom, $R_1$ is selected from the group consisting of hydrogen and methyl, and $R_2$ is an alkyl group of one to eight carbon atoms, said reaction product being obtained by carrying out the said reaction in butanol.

6. A composition of matter comprising the alcohol-modified reaction product of six to ten mols of formaldehyde and one mol of a bis-(aminotriazine) of the formula

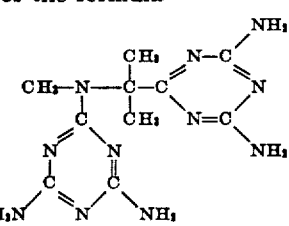

said reaction product being obtained by carrying out the said reaction in an alcoholic solvent.

7. A composition of matter comprising the butanol-modified reaction product of six to ten mols of formaldehyde and one mol of a bis-aminotriazine) of the formula

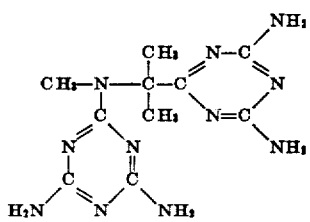

said reaction product being obtained by carrying out the said reaction in butanol.

8. A composition of matter comprising the alcohol-modified reaction product of six to ten mols of formaldehyde and one mol of a bis-(aminotriazine) of the formula

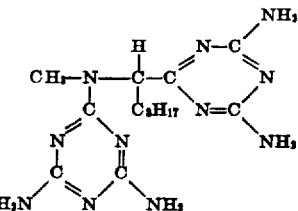

said reaction product being obtained by carrying out the said reaction in an alcoholic solvent.

9. A composition of matter comprising the butanol-modified reaction product of six to ten mols of formaldehyde and one mol of a bis-(aminotriazine) of the formula

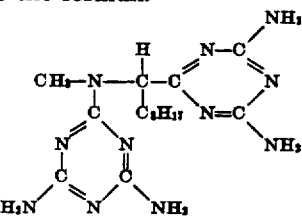

said reaction product being obtained by carrying out the said reaction in butanol.

10. A composition of matter comprising the alcohol-modified reaction product of six to ten mols of formaldehyde and one mol of a bis-(aminotriazine) of the formula

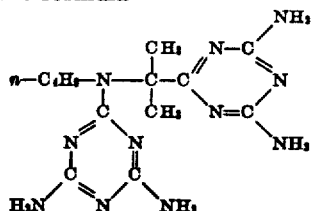

said reaction product being obtained by carrying out the said reaction in an alcoholic solvent.

11. A composition of matter comprising the butanol-modified reaction product of six to ten mols of formaldehyde and one mol of a bis-(aminotriazine) of the formula

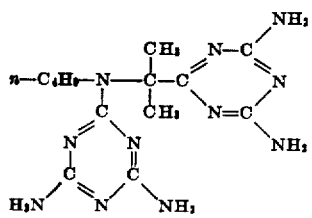

said reaction product being obtained by carrying out the said reaction in butanol.

PETER L. DE BENNEVILLE.
VINCENT CARR MEUNIER.

References Cited in the file of this patent

UNITED STATES PATENTS

| Number | Name | Date |
|---|---|---|
| 2,524,727 | Dudley | Oct. 3, 1950 |

FOREIGN PATENTS

| Number | Country | Date |
|---|---|---|
| 608,186 | Great Britain | Sept. 10, 1948 |

---

Certificate of Correction

Patent No. 2,653,143              September 22, 1953

PETER L. DE BENNEVILLE ET AL.

It is hereby certified that error appears in the printed specification of the above numbered patent requiring correction as follows:

Column 2, line 27, for "dicyanodiamine" read *dicyanodiamide*; column 9, lines 60 to 63, claim 3, for that portion of the formula reading

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.* mols of formaldehyde and one mol of a bis-(aminotriazine) of the formula

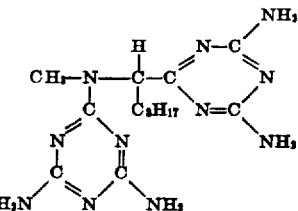

said reaction product being obtained by carrying out the said reaction in an alcoholic solvent.

9. A composition of matter comprising the butanol-modified reaction product of six to ten mols of formaldehyde and one mol of a bis-(aminotriazine) of the formula

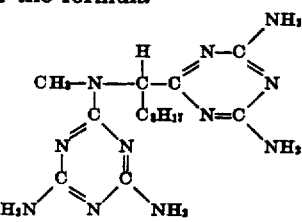

said reaction product being obtained by carrying out the said reaction in butanol.

10. A composition of matter comprising the alcohol-modified reaction product of six to ten mols of formaldehyde and one mol of a bis-(aminotriazine) of the formula

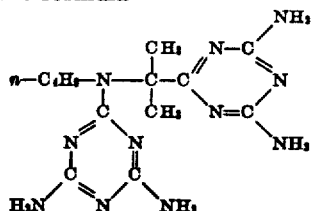

said reaction product being obtained by carrying out the said reaction in an alcoholic solvent.

11. A composition of matter comprising the butanol-modified reaction product of six to ten mols of formaldehyde and one mol of a bis-(aminotriazine) of the formula

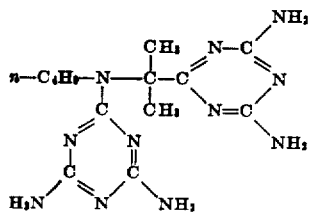

said reaction product being obtained by carrying out the said reaction in butanol.

PETER L. DE BENNEVILLE.
VINCENT CARR MEUNIER.

References Cited in the file of this patent

UNITED STATES PATENTS

| Number | Name | Date |
|---|---|---|
| 2,524,727 | Dudley | Oct. 3, 1950 |

FOREIGN PATENTS

| Number | Country | Date |
|---|---|---|
| 608,186 | Great Britain | Sept. 10, 1948 |

---

Certificate of Correction

Patent No. 2,653,143                         September 22, 1953

PETER L. DE BENNEVILLE ET AL.

It is hereby certified that error appears in the printed specification of the above numbered patent requiring correction as follows:

Column 2, line 27, for "dicyanodiamine" read *dicyanodiamide*; column 9, lines 60 to 63, claim 3, for that portion of the formula reading

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*

Certificate of Correction

Patent No. 2,653,143                                            September 22, 1953

PETER L. DE BENNEVILLE ET AL.

It is hereby certified that error appears in the printed specification of the above numbered patent requiring correction as follows:

Column 2, line 27, for "dicyanodiamine" read *dicyanodiamide*; column 9, lines 60 to 63, claim 3, for that portion of the formula reading

and that the said Letters Patent should be read as corrected above, so that the same may conform to the record of the case in the Patent Office.

Signed and sealed this 10th day of November, A. D. 1953.

[SEAL]

ARTHUR W. CROCKER,
*Assistant Commissioner of Patents.*